T. H. WEBB AND C. J. RHODES.
CLAMPING DEVICE FOR SHEARING MACHINES.
APPLICATION FILED MAY 28, 1918.

1,337,675.

Patented Apr. 20, 1920.

Inventors:-
Thomas Henry Webb and
Charles Joseph Rhodes.
By:- B. Singer Atty.

UNITED STATES PATENT OFFICE.

THOMAS HENRY WEBB AND CHARLES JOSEPH RHODES, OF WAKEFIELD, ENGLAND.

CLAMPING DEVICE FOR SHEARING-MACHINES.

1,337,675. Specification of Letters Patent. Patented Apr. 20, 1920.

Application filed May 28, 1918. Serial No. 237,126.

*To all whom it may concern:*

Be it known that we, THOMAS HENRY WEBB, general manager, and CHARLES JOSEPH RHODES, chairman of directors, both subjects of the Kingdom of Great Britain, residing at Grove Iron Works, Wakefield, England, have invented Clamping Devices for Shearing-Machines, of which the following is a specification.

This invention comprises a new or improved device or apparatus for retaining the work while being operated upon in shearing machines, presses, and the like.

According to the present invention, in a shearing machine, press, or the like, a holding device is provided for retaining the work while being operated upon, said holding device being actuated by the reciprocating member of the machine or press. This reciprocating member may impart rotation to a shaft which in turn imparts rotation to the holding or retaining element by the medium of cams.

In order that this invention may be clearly understood and readily carried into practice, reference may be had to the appended explanatory sheets of drawings, upon which:—

Figure 1:
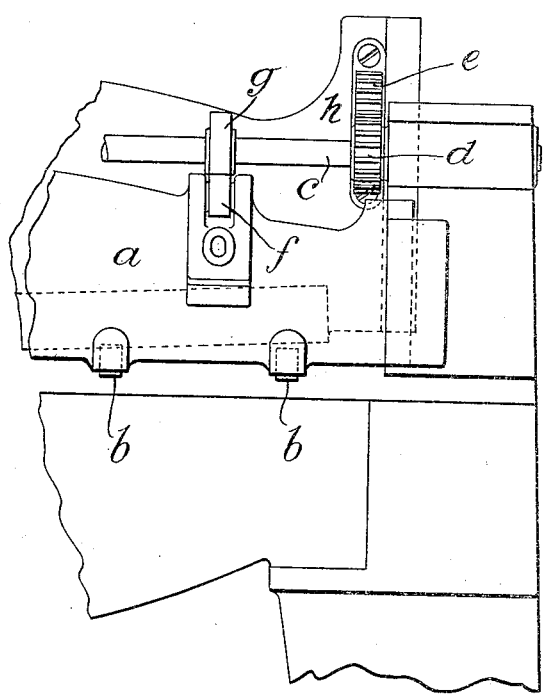
Figure 1 is a part elevation of a shearing machine involving the present invention.
Figure 2:
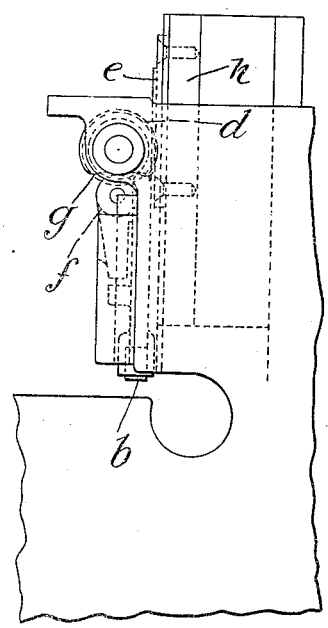
Fig. 2 is a part elevation of the machine shown in Fig. 1, the aspect of elevation being at right angles to that in the case of the figure last mentioned.
Figure 3:
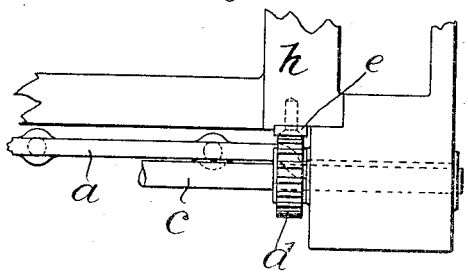
Fig. 3 is a part plan of the machine shown in Figs. 1 and 2.

In a convenient embodiment of the present invention, a vertically moving plate or holding member $a$ is suitably installed in the machine or press, and said plate or holding member is furnished with hard wood or other blocks $b$ adapted to grip the plate or element which is being operated upon. Above the said plate or holding member $a$ a rotary shaft $c$ is suitably installed, the axis of said shaft being stationary throughout its operation. Said shaft carries spur wheels or pinions $d$ which are in mesh with racks $e$ provided upon the reciprocating beam $h$ of the press, or the top blade holder of a shearing machine. When the beam or holder descends, the shaft is rotated by virtue of the movement of the racks, and cams $g$ carried by said shaft, by engagement with rollers $f$ carried by the retaining member, depress the latter with the result that the work is gripped.

The cams $g$ are of such shape that the plate or element which is being operated upon is gripped before cutting commences, and this grip is retained throughout the cutting stroke. As the beam or holder ascends, the cam-shaft revolves in the opposite direction to that in which it revolved when descending, and the plate or holding member is thereby caused to assume its initial position.

What we claim as our invention and desire to secure by Letters Patent is:—

1. In a machine of the class described, including a reciprocatory member and a movable clamping member, a rack carried by said reciprocatory member, a shaft mounted in fixed bearings and having a gear engaged by said rack, and a cam on said shaft for moving the clamping member.

2. In a machine of the class described, including a reciprocatory member and a movable clamping member, a roller carried by said clamping member, a rack carried by said reciprocatory member, a shaft mounted in fixed bearings and having a gear engaged by said rack, and a cam on said shaft, said cam coacting with said roller, to move the clamping member.

In witness whereof we have hereunto set our hands in the presence of two witnesses.

THOMAS HENRY WEBB.
CHARLES JOSEPH RHODES.

Witnesses:
BERT TOMLINSON,
EDW. OSWALD LIVINGSTON.